United States Patent
Wood et al.

(10) Patent No.: US 10,640,093 B2
(45) Date of Patent: May 5, 2020

(54) COLLAPSIBLE SNOW PADDLE AND METHOD OF USE

(71) Applicants: Stephen Patrick Wood, Tahoe City, CA (US); Lorraine Lee Wood, Tahoe City, CA (US)

(72) Inventors: Stephen Patrick Wood, Tahoe City, CA (US); Lorraine Lee Wood, Tahoe City, CA (US)

( * ) Notice: Subject to any disclaimer, the term of this patent is extended or adjusted under 35 U.S.C. 154(b) by 0 days.

(21) Appl. No.: 16/434,087

(22) Filed: Jun. 6, 2019

(65) Prior Publication Data

US 2019/0375380 A1 Dec. 12, 2019

Related U.S. Application Data

(60) Provisional application No. 62/681,591, filed on Jun. 6, 2018.

(51) Int. Cl.
*B60S 3/04* (2006.01)
*B25G 1/10* (2006.01)

(52) U.S. Cl.
CPC .............. *B60S 3/045* (2013.01); *B25G 1/102* (2013.01)

(58) Field of Classification Search
CPC ................................ B60S 3/045; B25G 1/102
See application file for complete search history.

(56) References Cited

U.S. PATENT DOCUMENTS

| 84,797 | A | * | 12/1868 | Connolly | ................. | A01B 1/02 |
| | | | | | | 294/49 |
| 1,066,562 | A | | 7/1913 | Wilkins | | |
| 1,191,810 | A | | 7/1916 | Miller | | |
| 1,202,791 | A | | 10/1916 | Brownstein | | |
| 1,572,824 | A | * | 2/1926 | Tatge | ........................ | E02F 3/02 |
| | | | | | | 37/283 |
| 1,693,472 | A | | 11/1928 | Batty | | |
| 2,098,609 | A | | 11/1937 | Bishop | | |
| 2,239,297 | A | | 4/1941 | Allen et al. | | |
| 2,463,150 | A | | 3/1949 | Camp | | |
| D162,897 | S | | 4/1951 | Still | | |

(Continued)

FOREIGN PATENT DOCUMENTS

| CA | D-27044 | 3/1965 |
| CA | 2025550 A1 * | 3/1991 |

(Continued)

OTHER PUBLICATIONS

Northern Tool + Equipment; Manplow Ultimate Telescoping Snow Car Tool.

(Continued)

*Primary Examiner* — Marc Carlson
(74) *Attorney, Agent, or Firm* — Holland & Hart LLP

(57) ABSTRACT

A collapsible snow paddle. The paddle includes an elongated handle, a rotatable coupling affixed to one end of the handle, and a generally planar snow remover, the rotatable coupling affixed to a rear surface of the remover so that the remover may be collapsed against the handle for storage and extended transverse to the handle for use. The snow remover may have a scraper edge inclined at an angle relative to the surface of the snow remover for scraping ice and a relatively soft capped edge for removing snow.

17 Claims, 14 Drawing Sheets

(56) References Cited

U.S. PATENT DOCUMENTS

| | | | |
|---|---|---|---|
| 2,704,036 A * | 3/1955 | Briggs | E01B 27/14 |
| | | | 104/13 |
| 2,919,153 A | 12/1959 | Benton | |
| 3,465,457 A | 9/1969 | Stone | |
| 3,473,838 A * | 10/1969 | Rankin | E01H 5/02 |
| | | | 294/53.5 |
| 3,583,747 A * | 6/1971 | Lambert | E04D 13/106 |
| | | | 37/268 |
| 3,773,375 A * | 11/1973 | Nehls | E04D 13/106 |
| | | | 37/268 |
| 4,094,543 A * | 6/1978 | Fratini | E01H 5/02 |
| | | | 294/54.5 |
| 4,264,095 A * | 4/1981 | Lemasters | E01H 5/02 |
| | | | 294/53.5 |
| 4,559,726 A | 12/1985 | Moisan | |
| 4,565,398 A * | 1/1986 | Poulin | A01B 1/20 |
| | | | 172/375 |
| D291,611 S | 8/1987 | Toth | |
| 4,848,819 A | 7/1989 | Moorefield | |
| 4,865,372 A * | 9/1989 | Gabriel | A01B 1/00 |
| | | | 294/49 |
| 4,865,373 A | 9/1989 | Hudson | |
| D305,468 S * | 1/1990 | Yonkers | D32/46 |
| 4,905,372 A | 3/1990 | Willis | |
| 4,908,900 A * | 3/1990 | McLaughlin | A47L 1/06 |
| | | | 15/105 |
| 4,947,562 A * | 8/1990 | Williamson | E01H 5/02 |
| | | | 15/236.02 |
| 4,996,834 A * | 3/1991 | Geist | A01D 7/00 |
| | | | 294/53.5 |
| 5,048,883 A | 9/1991 | Waluk | |
| 5,109,930 A * | 5/1992 | Napier | A01B 1/02 |
| | | | 111/99 |
| 5,346,269 A | 9/1994 | Price | |
| 5,522,629 A | 6/1996 | Loo | |
| 5,593,198 A * | 1/1997 | Vogel, II | E01H 5/02 |
| | | | 294/53.5 |
| 5,630,633 A * | 5/1997 | Dupre | A01B 1/222 |
| | | | 294/53.5 |
| 5,704,127 A | 1/1998 | Cordio | |
| 5,791,707 A * | 8/1998 | Szakurski | A01B 1/225 |
| | | | 294/51 |
| D397,591 S | 9/1998 | Susini, III | |
| 5,810,408 A * | 9/1998 | Armstrong | A01B 1/00 |
| | | | 16/422 |
| 5,829,808 A * | 11/1998 | Colla | E01H 5/02 |
| | | | 294/53.5 |
| 5,845,949 A | 12/1998 | Vosbikian | |
| 6,018,894 A * | 2/2000 | Whitehead | E04D 13/106 |
| | | | 294/54.5 |
| D431,101 S | 9/2000 | Gracy | |
| 6,158,791 A * | 12/2000 | Drew | E04D 13/106 |
| | | | 294/54.5 |
| 6,189,222 B1 * | 2/2001 | Doyle | B26B 21/523 |
| | | | 15/144.1 |
| 6,526,619 B1 * | 3/2003 | Cassels, Jr. | E04D 13/0765 |
| | | | 15/144.1 |
| 6,925,676 B2 * | 8/2005 | Heavner | E04D 13/0765 |
| | | | 15/236.04 |
| D511,032 S | 10/2005 | Roberts | |
| 6,990,705 B1 | 1/2006 | Schouten et al. | |
| D539,496 S * | 3/2007 | Sickler | D32/41 |
| D544,160 S | 6/2007 | Thomas | |
| 7,296,368 B1 * | 11/2007 | Rigo | E04D 13/106 |
| | | | 294/54.5 |
| 7,343,637 B2 * | 3/2008 | Lafleur | A46B 7/04 |
| | | | 15/105 |
| D593,267 S | 5/2009 | Terao | |
| 7,571,945 B2 | 8/2009 | Walker et al. | |
| D611,653 S | 3/2010 | Marut | |
| D620,658 S | 7/2010 | Johnson | |
| 7,762,597 B2 | 7/2010 | Marlin | |
| 8,100,447 B2 * | 1/2012 | DeWinter | E01H 5/02 |
| | | | 294/51 |
| 8,256,809 B2 * | 9/2012 | Coutu | A01B 1/20 |
| | | | 294/51 |
| 8,347,528 B1 * | 1/2013 | Seltzer | E04D 13/106 |
| | | | 172/371 |
| 8,375,500 B1 | 2/2013 | Aguirre | |
| 8,464,387 B1 | 6/2013 | Cohen | |
| 8,800,175 B1 * | 8/2014 | Faraci | E01H 5/02 |
| | | | 294/54.5 |
| D714,006 S * | 9/2014 | Sanchez | A46B 17/00 |
| | | | D32/35 |
| D724,286 S | 3/2015 | Colangelo | |
| 8,973,201 B1 * | 3/2015 | De Vito | A46B 7/04 |
| | | | 15/144.1 |
| 9,049,918 B2 * | 6/2015 | Perelli | A46B 5/0033 |
| 9,119,337 B2 * | 9/2015 | Frati | A01B 1/225 |
| 9,145,112 B1 | 9/2015 | Ihde | |
| 9,320,347 B1 * | 4/2016 | Skarzynski | A46B 5/002 |
| 9,345,314 B2 * | 5/2016 | Henningsen | A46B 5/005 |
| 9,427,862 B1 * | 8/2016 | Durfee, Jr. | B25G 3/26 |
| 9,587,359 B1 | 3/2017 | Yu | |
| D782,889 S | 4/2017 | Vera Andrades | |
| 9,913,565 B2 * | 3/2018 | Smith | A47L 13/11 |
| 9,925,961 B2 | 3/2018 | Cohen | |
| D824,128 S * | 7/2018 | O'Shea | D32/46 |
| D853,672 S * | 7/2019 | Beyda | D32/50 |
| D866,896 S | 11/2019 | Gee, II et al. | |
| 2003/0146632 A1 * | 8/2003 | Marion | B60S 3/045 |
| | | | 294/51 |
| 2004/0177461 A1 | 9/2004 | Ajluni | |
| 2004/0250365 A1 * | 12/2004 | Anderson | A46B 15/0081 |
| | | | 15/111 |
| 2004/0250367 A1 * | 12/2004 | Fraser | A47L 1/06 |
| | | | 15/245 |
| 2011/0258889 A1 | 10/2011 | Settembre et al. | |
| 2013/0139414 A1 * | 6/2013 | Hogenson | E01H 5/02 |
| | | | 37/266 |
| 2013/0168983 A1 * | 7/2013 | Swanger | E01H 5/02 |
| | | | 294/53.5 |
| 2014/0007364 A1 | 1/2014 | Cohen | |
| 2014/0245557 A1 * | 9/2014 | Cohen | B60S 3/045 |
| | | | 15/236.01 |
| 2016/0222613 A1 | 8/2016 | Stoddart | |
| 2017/0113660 A1 * | 4/2017 | Cohen | B60S 3/045 |
| 2017/0240143 A1 | 8/2017 | Vaeth | |
| 2017/0366291 A1 | 12/2017 | Boduch et al. | |

FOREIGN PATENT DOCUMENTS

| | | |
|---|---|---|
| FR | 2861950 | 7/1916 |
| JP | D1497125 | 5/2014 |

OTHER PUBLICATIONS

Northern Tool + Equipment; The Snowplow Snow Pusher.

Youtube Snoshark channel, videos 2018, https://www.youtube.com/channel/UC4BdLFtl31w85YFDu7RHpOw, site visited May 15, 2019.

Snoshark website date Aug. 26, 2018, Wayback machine, visited May 15, 2019.

Youtube, Paddle and Scraper on a Snow Blower, video Jun. 27, 2011, site visited May 15, 2019, https://www.youtube.com/watch?v=aZQOrcfjMtO.

International Search Report and Written Opinion of the International Searching Authority for International Application PCT/US19/35876, dated Aug. 30, 2019.

SnowShark Kickstarter Story (Sno Shark) Oct. 29, 2018 https://www.youtube.com/watch?y=MrW1MAre-bQ.

* cited by examiner

COLLAPSIBLE SNOW PADDLE AND METHOD OF USE

CROSS-REFERENCE TO RELATED APPLICATION

This application claims priority to, and incorporates by reference, the applicants' prior U.S. provisional patent application entitled Collapsible Snow Paddle and Method of Use, Ser. No. 62/681,591, filed Jun. 6, 2018, which application is incorporated by reference in its entirety.

FIELD OF TECHNOLOGY

This application relates to a collapsible snow paddle and method of use, particularly in removing snow or ice from a vehicle.

BRIEF ASPECTS OF THE BACKGROUND OF THIS SPECIFICATION

Snow removal from cars, trucks, and other vehicles has long presented a challenge. The challenge has long been particularly great when the accumulation of snow on the vehicle is substantial.

For example, in order to remove ice from a large vehicle front or rear window with an ice scraper, it can be difficult to reach the center area of the window unless the scraper is mounted to a long handle. Such scrapers exist but their typically fixed length consumes substantial space when stored in the vehicle such as on a rear seat or on the floor adjacent the rear seat.

Some such scrapers have long included a snow brush mounted on the handle for brushing snow off the vehicle. The snow brush bristles are typically quite flexible in order to prevent the bristles from scratching the vehicle's outer surfaces when used to remove snow from them. The snow brush is therefore typically easily bent, including by resistance presented by snow on the vehicle. As a result, removing snow from the vehicle with the brush can be difficult and time consuming, especially if the snow is deep or wet and heavy.

When snow is deep or wet and heavy, one common snow removal technique has been to use a conventional fixed-length snow shovel or a smaller, collapsible snow shovel. Conventional fixed-length show shovels are bulky and consume substantial storage space in the vehicle. Many vehicles are too small for such shovels. Smaller, collapsible snow shovels consume less space and are storable in most cars and trucks. Such shovels commonly have a collapsible handle, a shovel extending from one end of the handle, and a T-shaped grip extending transversely from the opposite end of the handle. They have been made of a variety of materials, such as aluminum or plastic.

These types of collapsible snow shovels are still somewhat bulky due to the rigid shovel extending from one end of the collapsible handle. They have not included an integral window scraper, and they have required a somewhat horizontal snow shoveling technique which can be difficult to employ when snow is in difficult-to-reach areas such as on the roof of the car or in a truck bed.

The Rapala Folding Pack Shovel with Bag has a foldable handle that can be folded and rotated with respect to the shovel to abut the shovel. This product can be stored in its accompanying bag. When extended, the handle is short and only approximately 13-15 inches long. Thus, this product is difficult to use for snow removal, especially on larger vehicles. It also does not include an ice scraper suitable for use on vehicle windows. When collapsed, the handle bends to fold upon itself and then rotates to abut the shovel end, providing a relatively thick, space-consuming folded shovel.

BRIEF SUMMARY OF CERTAIN ASPECTS OF THIS SPECIFICATION

The inventors believe they have discovered at least some of the issues—and the severity of those issues—identified in the Background section above. The inventors have therefore invented a collapsible snow shovel, or paddle, providing an apparatus with a paddle (shovel) end opposite a window-scraper end.

In some embodiments, a collapsible handle is rotatably mounted to a paddle. In some instances a rotatable mount is disposed on a back surface of the paddle intermediate the opposed paddle end and window-scraper end of the handle.

Some applications provide a handle that telescopes from a collapsed position to an extended position and vice versa. At least some such applications can thus provide a snow paddle with a relatively short handle when fully collapsed for storage while also providing a snow paddle with a relatively long handle when extended for use. Some embodiments provide a handle with three or more telescoping sections so that the handle can be adjusted to provide any of several differing handle lengths during use.

Some embodiments include a handle grip at the end of the handle opposite the paddle. The handle grip can extend transverse to a longitudinal axis of the handle.

Some applications include a hand grip tube mounted about the thickest of the telescope sections.

The collapsible handle can have an elliptical or oblong cross-section with opposed widened sides extending generally parallel to the longitudinal axis of the handle. Some such applications can provide greater torsional stability for the handle.

In some embodiments the snow paddle may have a substantially planar paddle surface. The paddle may be rotatable about the paddle mount on the handle from a fully extended open position generally transverse to the longitudinal axis of the handle to a fully closed position with its planar surface generally parallel to and abutting the handle. The paddle may include a relatively soft snow shovel cap along one edge.

In the fully extended or open position, the snow paddle can be used to push or pull snow off of a surface such as a vehicle surface. For example, in some embodiments the user can grip the handle with one or two hands to push or pull the paddle and thereby push or pull snow with either surface of the paddle. In some embodiments, the user can alternatively use a scraper edge opposite the snow shovel cap to scrape snow or ice off of a surface. In some instances the user may position the scraper edge into snow on a surface and simultaneously use the scraper edge to scrape the surface and the paddle surface to push or pull snow off of the surface.

Some applications can allow the user to use the snow paddle with the handle telescoped to its minimum length and then grip the telescoped handle and scape snow or ice off of a surface with the paddle in either its collapsed or open position.

Embodiments can provide any or all of the features described above embodied in a unitary, light weight, and durable snow paddle and scraper that may be quite compact when telescoped and collapsed. Some embodiments can be small enough to store under a vehicle seat or in some other relatively small space in the vehicle.

There are other novel features and advantages of the disclosure of this specification. They will become apparent as this specification proceeds. In this regard, it is to be understood that the scope of the invention is to be determined by the claims as issued and not by whether it addresses an issue because it is set forth in the Brief Background or provides a feature because it is set forth in this Brief Summary.

BRIEF DESCRIPTION OF THE DRAWINGS

The preferred and other embodiments are disclosed in association with the accompanying Figures in which.

DETAILED DESCRIPTION

This Detailed Description describes some embodiments but is not limiting of the scope of the invention. Further, components of these embodiments may be mixed and matched in differing permutations and combinations.

Figure 1:
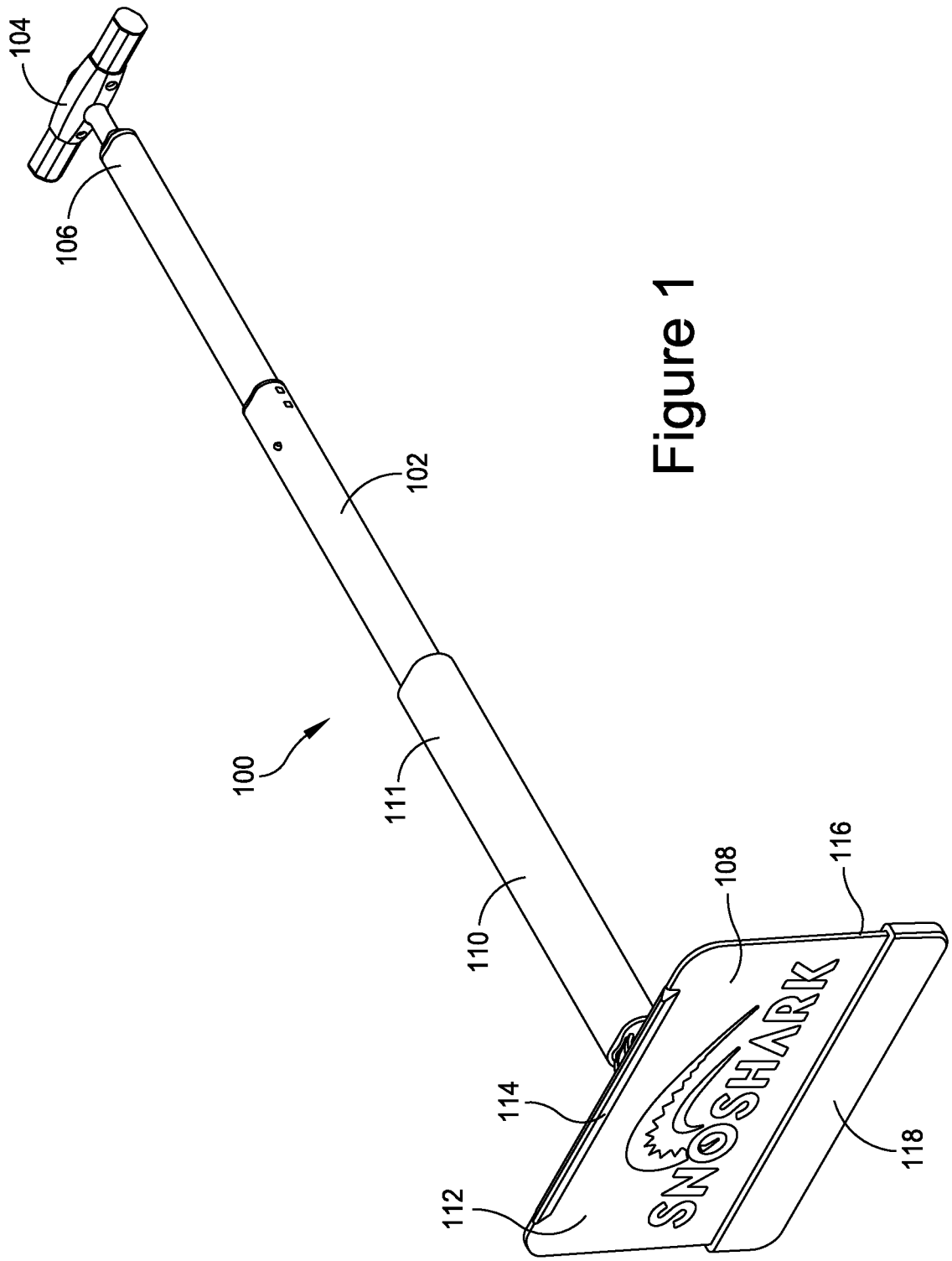
FIG. 1 is a perspective view of an embodiment of a fully extended collapsible snow paddle and ice scraper.

With reference now to FIG. 1, a fully extended, collapsible snow paddle, generally 100, has a telescoping handle 102 with a handle grip 104 at the handle's narrow end 106 and a snow paddle/scraper 108 at the handle's thickest, enlarged end 110. The handle grip 104 is transverse to a laterally-extending axis of the telescoping handle 102, and, in the extended, open position of FIG. 1, the snow paddle/scraper 108 is also generally transverse to the laterally-extending axis of the telescoping handle 102. A relatively soft, flexible, and resilient foam tube 111 is mounted about the handle's thickest, enlarged end 110 so that a user can grip the handle grip 104 with one hand and the enlarged end 110 through the foam tube 111 with the other hand.

The snow paddle/scraper 108 has a planar, somewhat rectangular, rigid central snow-removal paddle 112 with a laterally extending ice scraper edge 114 opposite a laterally extending lower edge 116. A relatively softer (as compared to the central snow removal paddle 112 and ice scraper edge 114), flexible, laterally extending, and resilient plastic lower edge cap 118 is mounted to surround the lower edge 116 of the central snow paddle 112 in order to prevent the lower edge 116 from scratching vehicle surfaces such as painted metal, windows, and seals.

The edge cap 112 is removable from, and replaceable on, the lower edge 116 central snow removal paddle 112. Thus, the edge cap 112 can be easily replaced as it becomes damaged or worn down, which can economically extend the usability of the remaining components of the paddle 100 as well as provide further revenue for a business directed to selling the snow paddle 100 and its replaceable edge cap 112.

FIGS. 2-11 depict the basic snow paddle 100 of FIG. 1 with yet additional structure, such as an additional, outwardly and laterally extending sharpened but relatively thin scraper edge 118. In some embodiments, the scraper edge 118 is made of material more rigid than that of a relatively more flexible and soft central snow-removal paddle 112.

Figure 2:
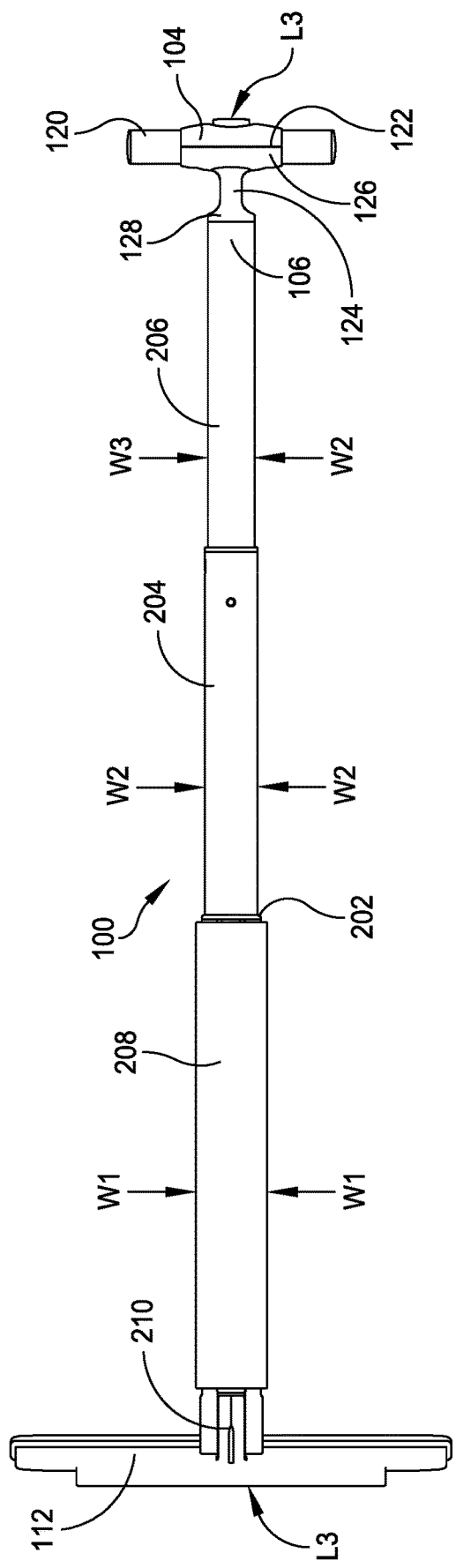
FIG. 2 is a plan view of a variant the snow paddle and ice scraper of FIG. 1.

With reference now to FIG. 2, the handle grip 104 has a central. laterally extending tubular section 120 mounted within a T-shaped rigid plastic grip/mount 122. An I-component 124 of the T-shaped mount 122 is narrowed with respect to its transverse component 126 surrounding the central tubular section 120. The lower end 128 of the I-component 124 is securely mounted within, and penetrates, the telescoping handle's narrow end 106.

Figure 3:
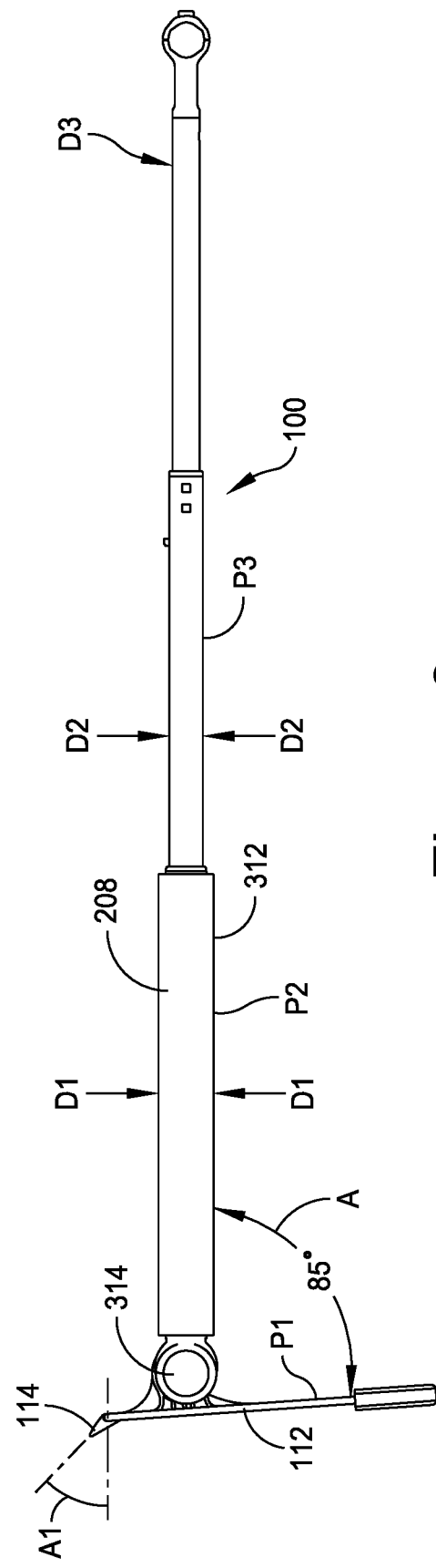
FIG. 3 is an elevational view of the snow paddle and ice scraper of FIG. 2.
Figure 13:
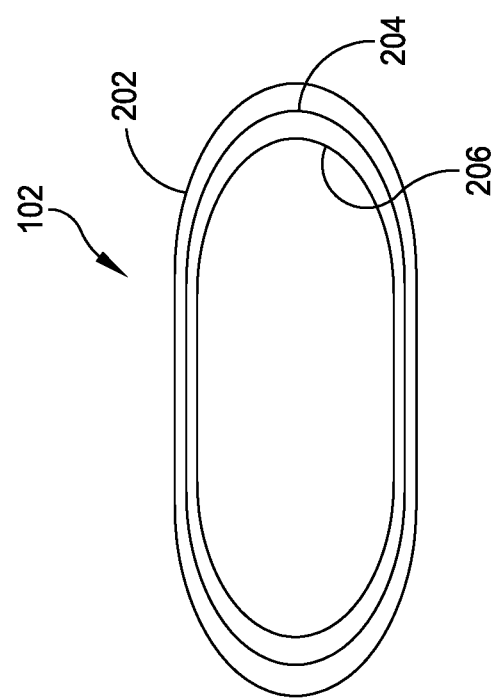
FIG. 13 is a section view of an embodiment of the handle taken along the line X-X in FIG. 7.
Figure 15:
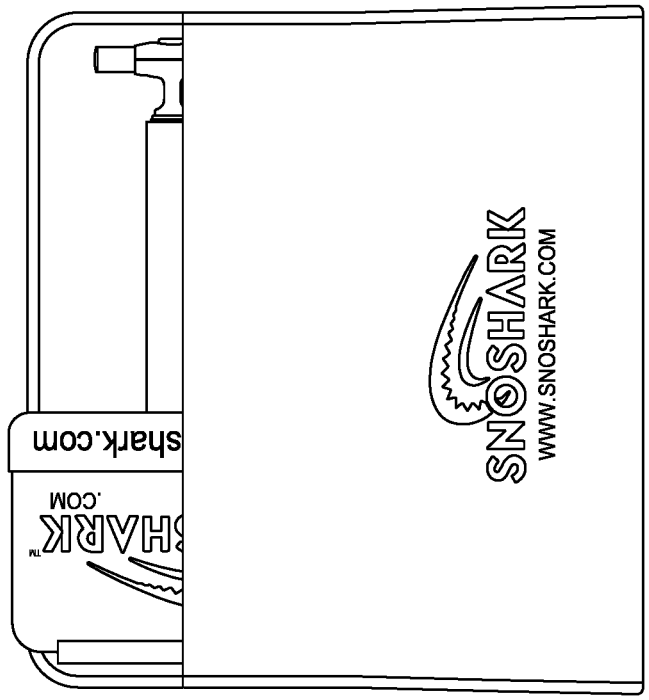
FIG. 15 is a plan view of the snow paddle bag of FIG. 14 but with the upper, wider end open and snow paddle partially inserted in the paddle bag.
Figure 14:
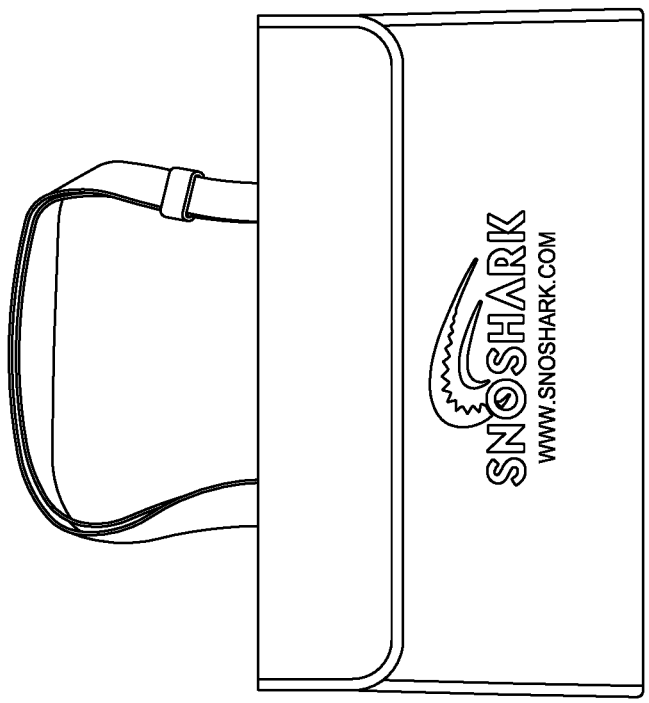
FIG. 14 is a plan view of an alternative, wider snow-paddle bag with the snow paddle inserted in the closed bag through an upper wider opening (not shown in FIG. 14) and having a should strap for easy carrying of the paddle within the bag.

With reference now to FIGS. 2, 3 and 13, in some embodiments the three telescoping handle tubes 202, 204, and 206 have an oblong, tubular cross-section and an oblong, tubular, flexible, compressible, resilient foam grip 208 surrounds the widest handle tube 202 adjacent a rotatable paddle mount 210 to which the paddle 112 is mounted. The widths W1-W1, W2-W2, and W3-W3 of the three telescoping handle sections 202, 204, and 206, respectively, are substantially greater than their respective depths D1-D1, D2-D2, and D3-D3. In one embodiment, the widths and depths are as follows: W1-W1, W2-W2, and W3-W3 are 1.5, 1.3, and 1.2 inches, respectively, and D1-D1, D2-D2, and D3-D3 are 1.0, 0.8, and 0.6 inches, respectively; and the thickness of the foam grip 208 is 0.3 inches. The tubular walls of the telescoping handle sections 202, 204, 206 are approximately 0.018 inches thick.

The telescoping handle 102 could have more than 3 telescoping sections to provide, for example, greater reach in some applications; or the telescoping handle could have fewer than three sections. The handle could be other than tubular in cross-section, such as square for example. The handle sections may all be of the same length or they may be of differing lengths as desired. In some embodiments the handle 102 may consist of only one section.

Figure 8:
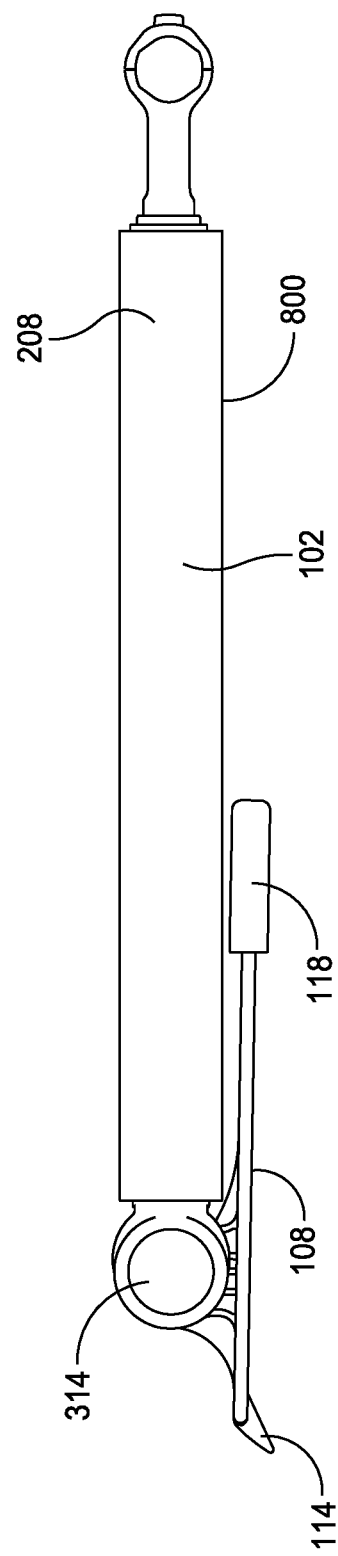
FIG. 8 is an elevational view of the fully collapsed snow paddle and ice scraper of FIG. 7.
Figure 9:
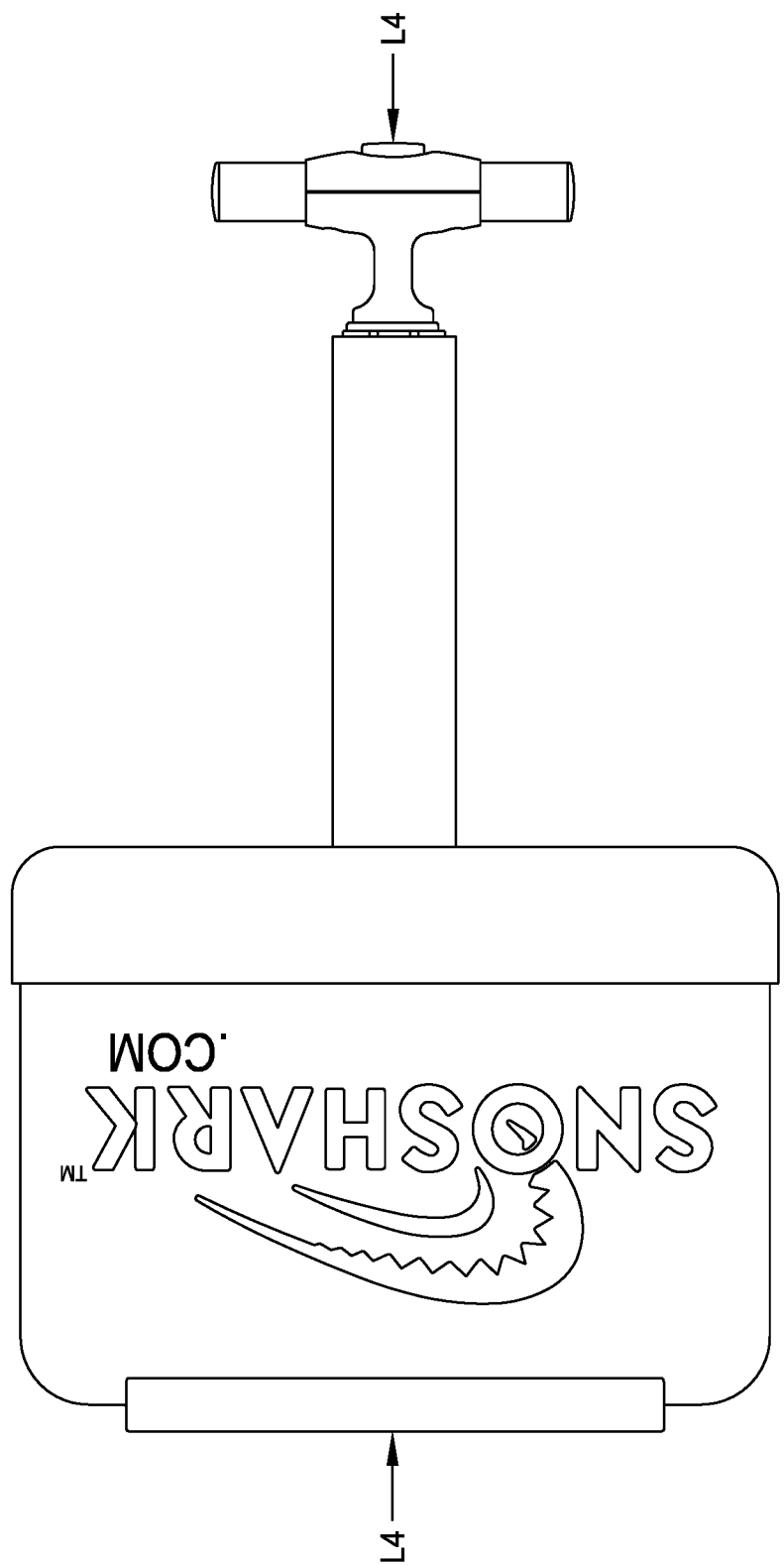
FIG. 9 is a bottom view of the fully collapsed snow paddle and ice scraper of FIG. 7.

Referring now to FIG. 3, when the snow paddle 100 is in the fully opened position, a plane P1 of the paddle 112 is parallel to the axis of the handle grip 104 and defines an angle A of about 86 degrees to a plane P2 of the lowermost side 312 of the foam grip 208. The scraper edge 114 extends from the central paddle 112 at an angle µ1 of approximately 45 degrees from the plane P1 of the paddle 112. This angle μl could vary from 0 degrees to 170 degrees; and angle A may also vary by up to about plus or minus 30 degrees. As shown in FIG. 8, the scraper edge 114 may have a generally triangular cross-section with a somewhat rounded scraping edge 115 on its distal end 115 opposite its wider end 117 integrally formed on, or otherwise secured to, the central paddle 112.

Figure 4:
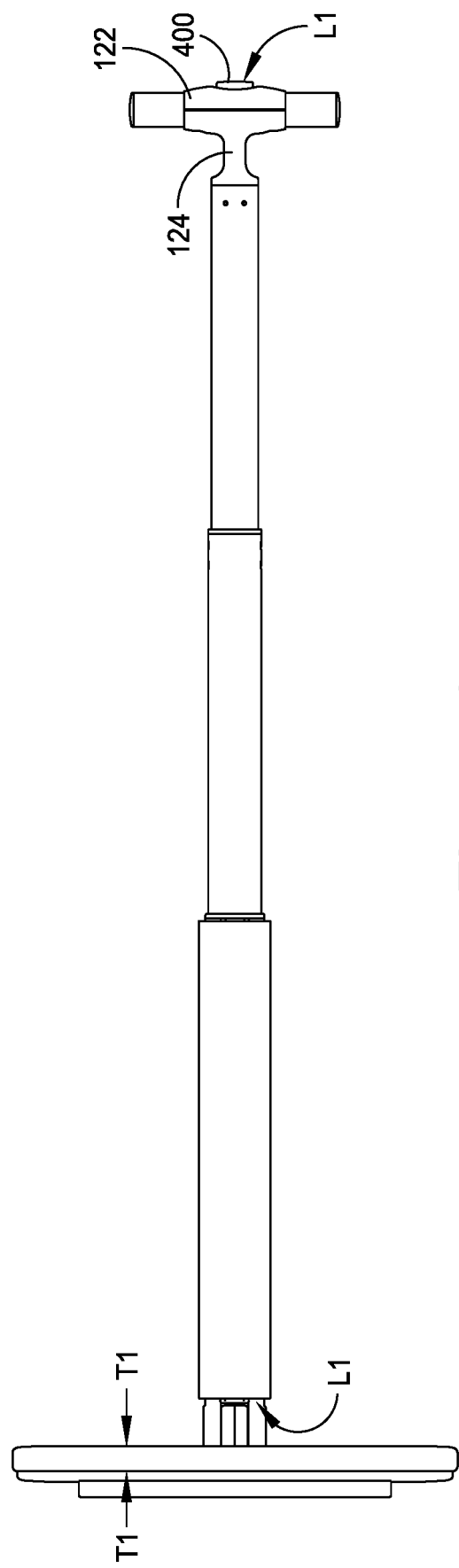
FIG. 4 is a bottom view of the snow paddle and ice scraper of FIG. 2.
Figure 7:
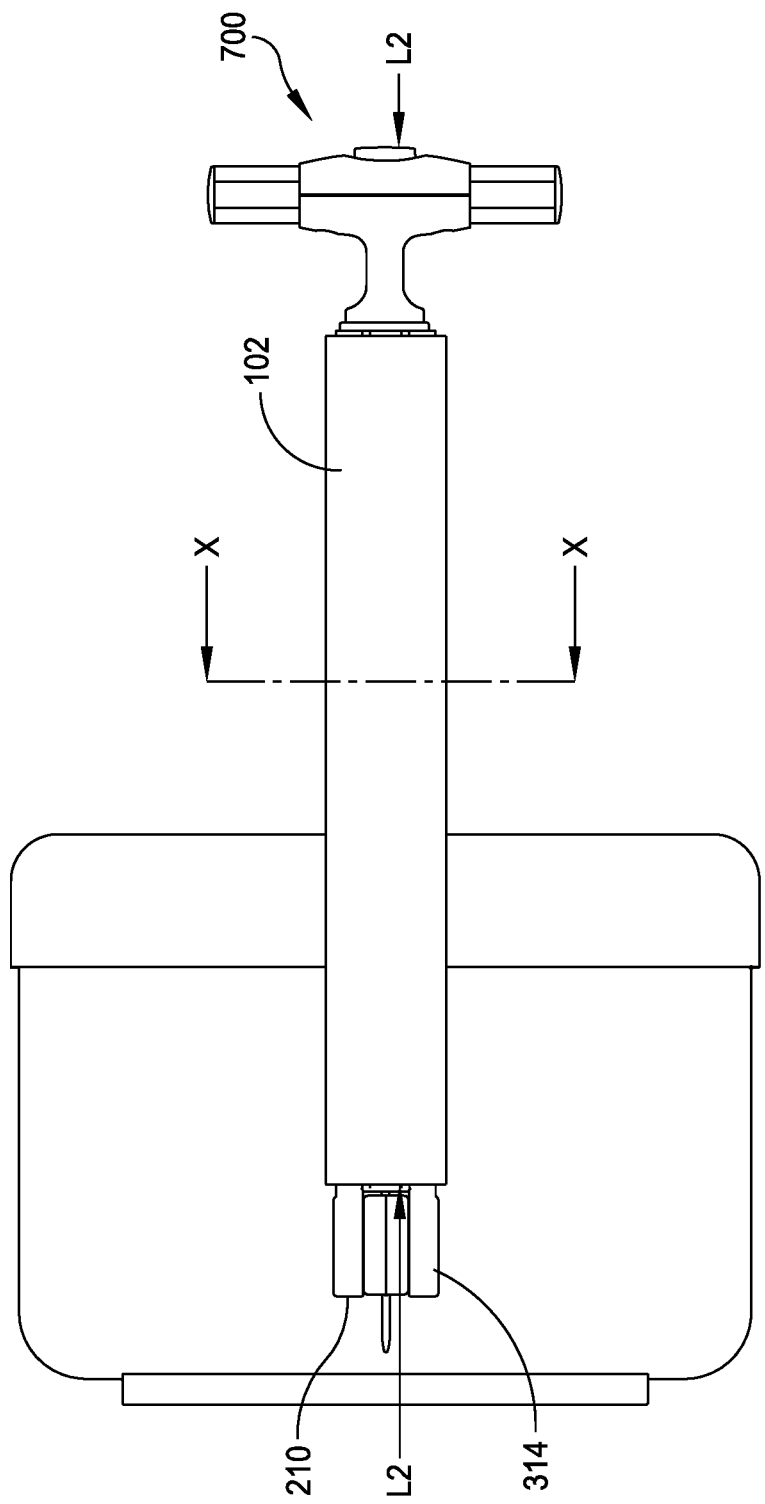
FIG. 7 is a plan view of the snow paddle and ice scraper of FIG. 2 in its fully collapsed position.

With reference to FIG. 4, the lateral length of the fully extendable telescoping handle L1-L1 is about 37.5 inches. A spring biased, handle collapsing button 400 extends laterally outwardly coaxial with the central axis of the I-component 124 of the T-shaped grip/mount 122. Pressing this button 400 and pushing of the handle grip 104 causes internal collapsing structure (not shown) to fully collapse the telescoping handle 102 so that, as shown in FIG. 7, the length L2-L2 of the telescoping handle is shortened to 17 inches. The internal collapsing structure is of the same type used to collapse telescoping luggage handles.

With reference back to FIG. 2, the overall lateral length of the fully extended and opened snow paddle L3-L3 is 39 inches. With contrasting reference to FIG. 9, the overall lateral length of the fully collapsed and closed snow paddle L4-L4 is 20 inches.

Figure 5:
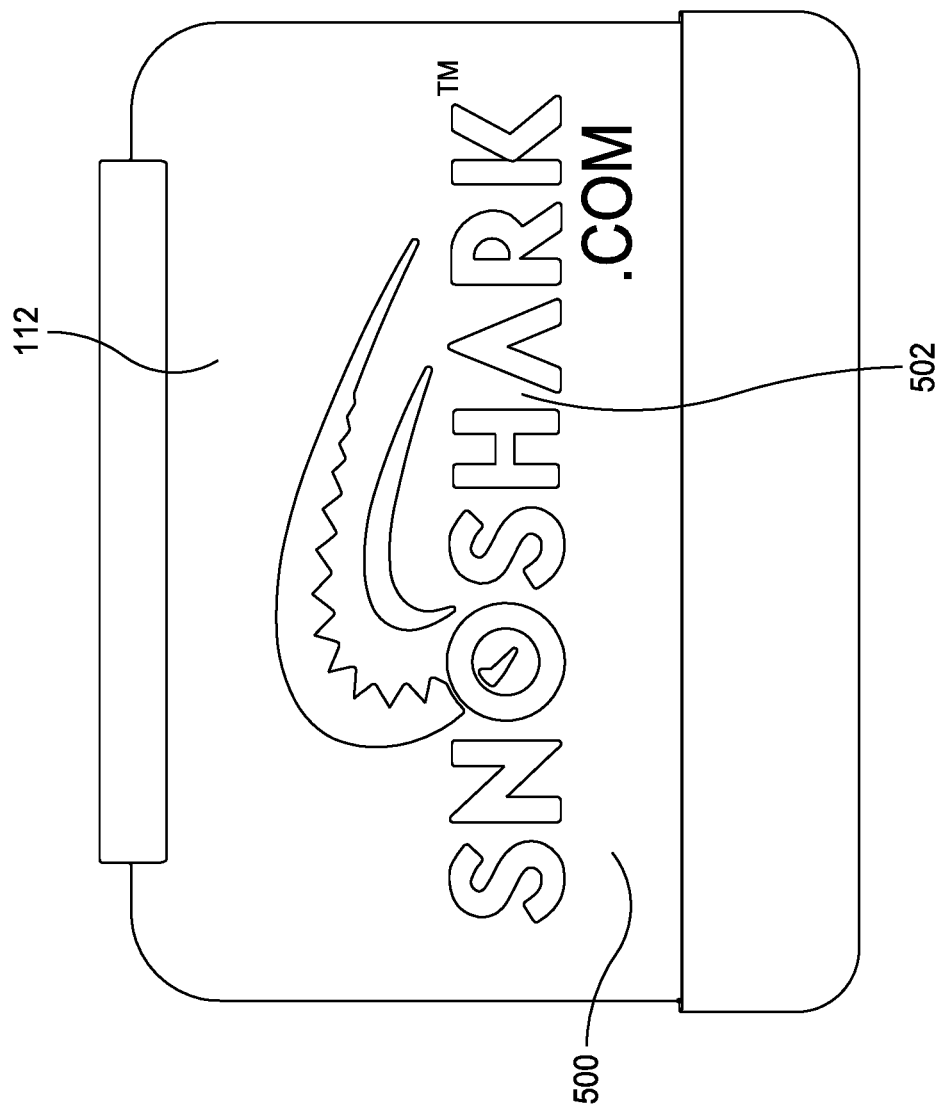
FIG. 5 is a side view of the paddle end of the snow paddle and ice scraper of FIG. 2.

Referring now to FIG. 5, the outer surface 500 of the central paddle 112 can include indicia 502 such as trade identify information for example. The indicia 502 may be formed on the central paddle 112 in any suitable way, such as, for example, by painting on, or laser cutting into, the outer surface 500. The central paddle 112 may also have rounded peripheral corners 504, 506, 508, 509 to prevent damaging a surface (including human skin) with which they may come into contact during use or when stored or other non-use.

Figure 6:
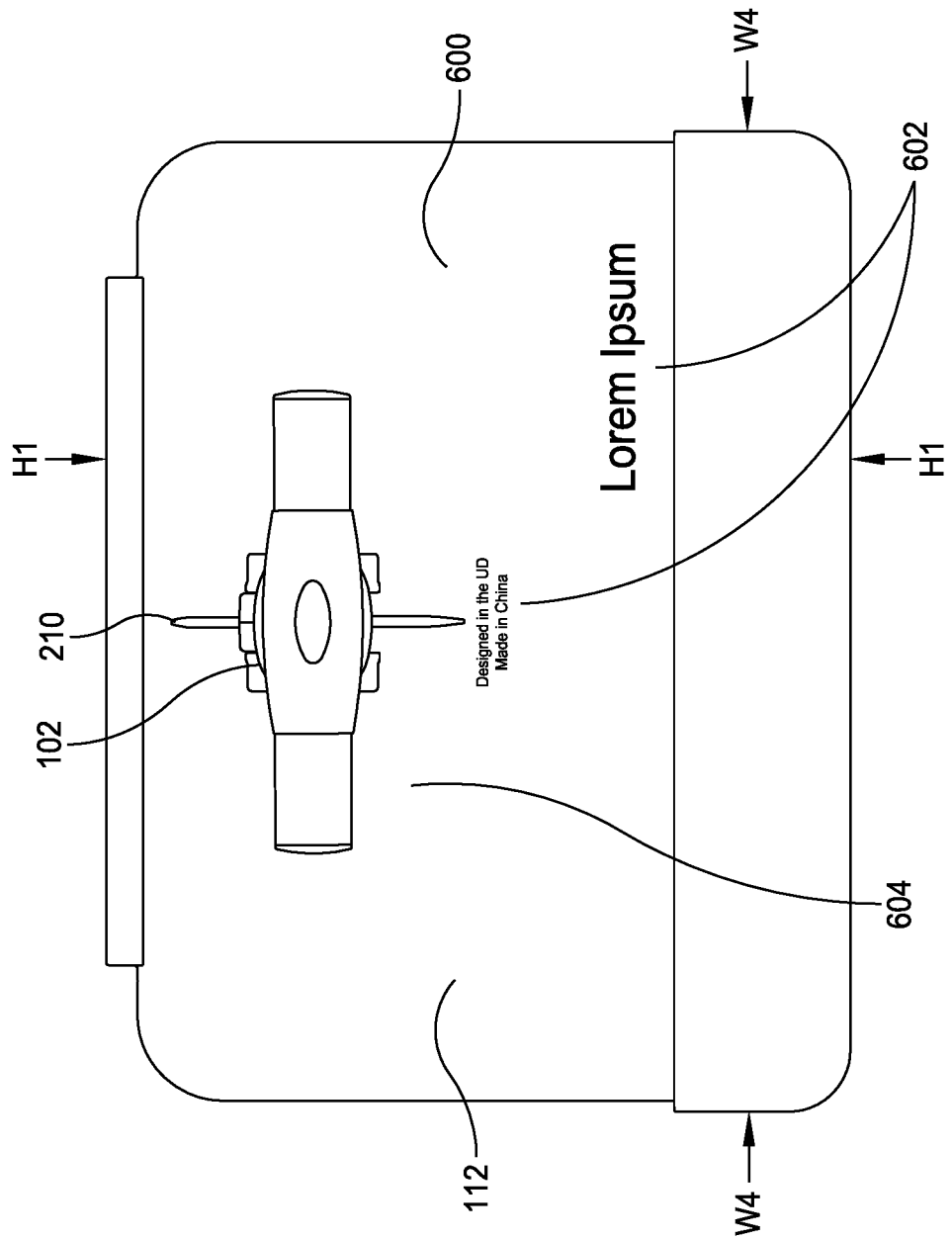
FIG. 6 is a side view of the handle end of the snow paddle and ice scraper of FIG. 2.

Referring now to FIG. 6, the inner surface 600 of the central paddle 112 can also include indicia 602 formed in any suitable way. The paddle mount 210 can be mounted closer to the scraper edge 114 than the lower edge 116 surrounded by the edge cap 118, providing a substantially larger paddle surface area 604 below the paddle mount 210 and the telescoping handle 102 extending from the paddle mount 210. The paddle's inner surface 600 can therefore be used to pull material, such as snow, off of a surface; and, with contrasting reference to FIG. 5, the paddle's outer surface 500 can be used to push material off of a surface.

The paddle's height H1-H1 can be about 8 inches and its width W4-W4 can be about 11 inches or 28.59 cm. The thickness of the edge cap material can be approximately 0.25 inches. With reference back to FIG. 4, the thickness T1-T1 of the central paddle 112 can be approximately ⅛th of an inch, for example.

With reference to FIGS. 3, 4, and 7, by collapsing the telescoping handle 102 as described above and then pressing and depressing a spring-biased paddle rotation button 314 within a tubular button housing 316 with its axis extending (i) transverse to the axis of the handle 102 within the paddle mount 210 and (ii) parallel to the axis of the handle grip 104, the snow shovel 700 fully collapses to a collapsed position as shown in FIGS. 7-11. With reference to FIG. 8, in the fully collapsed position, the snow paddle/scraper 108 has been rotated and locked so that the edge cap 118 securely abuts the lowermost underside 800 of the foam grip 208 and the collapsed telescoping handle 102 is securely locked in the collapsed state. In one embodiment, the edge cap has a thickness ET of 1.17 cm, a height EH of 5.7 cm, a weight of 66.5 g, and a durometer shore 00 rating of 30 to 80, for example 65; and the snow removal paddle 112 has a durometer shore A rating of from 55-100, for example 80.

In the fully collapsed position, the scraper edge 114 of the snow paddle 100 can be used as an ice scraper. Alternatively, when in the fully collapsed position, pressing the paddle rotation button 314 can allow the user to rotate the paddle/scraper to its fully extended and opened position (not shown in FIG. 8) and use this arrangement of the snow paddle either as a shortened snow-removal paddle or snow or ice scraper.

Figure 10:
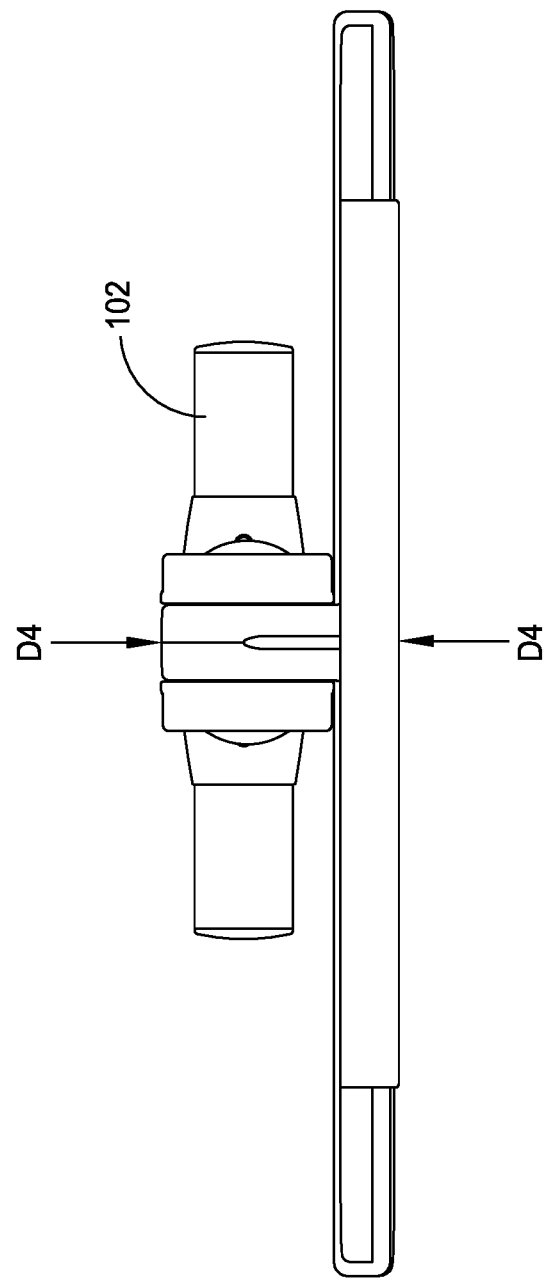
FIG. 10 is a side view of the paddle end of the fully collapsed snow paddle and ice scraper of FIG. 7.
Figure 11:
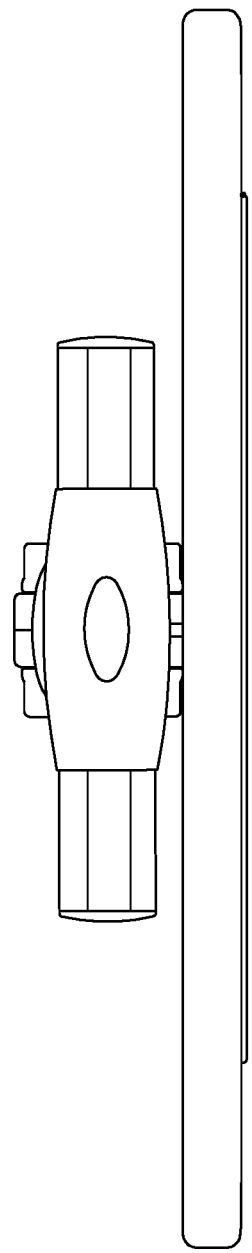
FIG. 11 is a side view of the handle end of the fully collapsed snow paddle and ice scraper of FIG. 7.

With reference now to FIG. 10, the depth D4-D4 of the collapsed snow paddle 102 is approximately 1 and ⅝th inches. The relatively small volume and size of this embodiment of the collapsed snow paddle 102 frequently can be stored under a vehicle seat, behind a seat, on a vehicle floor, or in a utility container or drawer such as on the back of a truck.

Figure 12:
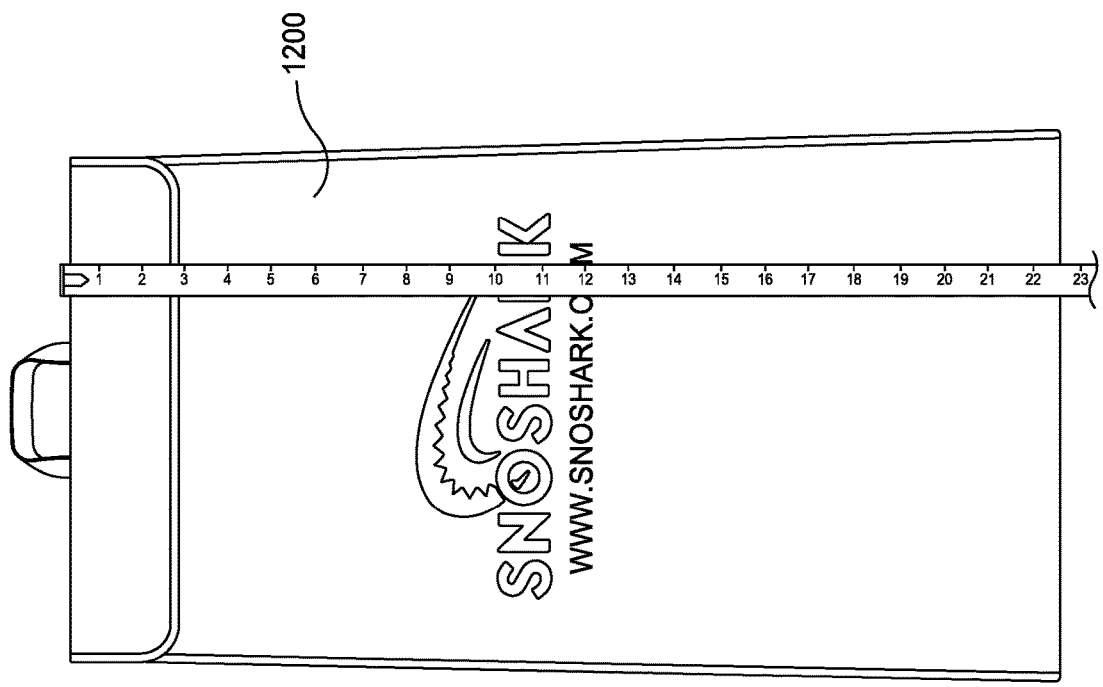
FIG. 12 is a plan view of a snow-paddle bag in which the collapsed snow paddle can be easily inserted through a narrower top end of the bag, also having a handle, and then stored and transported.

With reference now to FIG. 12, the snow paddle when collapsed can be attractively stored in a snow paddle bag such as the bag 1200 shown in FIG. 12. One embodiment of this bag 1200 can be approximately 22-23 inches high by 12-13 inches wide. The external periphery of the snow paddle bag can also include indicia, such as trademark(s), web site url, and other information as desired.

With reference back to FIGS. 2-4, the following components may be made with the following materials:
 telescoping tubes 202, 204, 206: metal such as aluminum;
 central paddle 112: rigid plastic, such as HDPE, nylon, or polypropylene;
 scraper edge 114: rigid plastic, such as HDPE, nylon, or polypropylene;
 edge cap 118: relatively soft and stretchable plastic such as EVA or polyethylene;
 rotation button 314: a rigid plastic, such as HDPE, nylon, or polypropylene;
 tubular button housing: zinc alloy;
 paddle mount 210: a rigid plastic, such as HDPE, nylon, or polypropylene;
 handle grip tubular section 120: 0.2 inch thick aluminum of;
 T-shaped mount 122: rigid plastic, such as HDPE, nylon, or polypropylene;
 snow paddle bag: any suitable fabric, such as polyester or polypropylene; and
 foam grip 208: plastic foam, such as molded polyethylene foam or PP/TPE or EVA.

One of more of the plastic components above may also include anti-freeze mixed within it or coated on the outer surface. In one embodiment, at least the foam grip 208, paddle mount 210, and T-shaped mount include such anti-freeze.

The entire collapsed snow paddle of FIGS. 7-11 weighs approximately 0.5 to 2 lbs. In the depicted embodiment it may weigh about 0.5-0.75 lb. The snow paddle bag 1200 of FIG. 12 weighs about 7 ounces. The collapsed snow paddle and bag are thus not only compact but also light weight and economical to ship, store, and transport.

An alternative embodiment of the snow paddle (not shown) may be substantially larger than the snow paddle of FIGS. 1-11, such as for use with large vehicles like trucks and large SUVs. For example, such a snow paddle may weigh 2.5 lbs. and have a fully extended length, from snow paddle to the opposed handle, of 54 inches and a fully collapsed length, of 24 inches.

One method of use of the snow paddle and bag is as follows:
 remove the snow paddle from its place of storage and bag;
 extend the telescopic handle if desired;
 press the paddle rotation to rotate the paddle to the extended and fully open position;

if desired, hold the foam grip with one or two hands to scrape ice on a surface with the scraper edge;

if desired, grasp the handle grip with one hand and the telescoping handle with the other hand and insert opened paddle into snow on a surface and push or pull the telescoping handle and paddle to push snow away or pull it off the surface (note that the depicted size of the rigid paddle can push or pull relatively large quantities of snow; larger paddles can push or pull yet larger quantities; also note that the paddle scraper edge can be inserted into snow to both scrape with the scraper edge and remove push or pull snow at the same time);

fully collapse and close the snow paddle; and place the snow paddle in its storage bag and store the paddle and bag as desired.

Yet other variations for use of the snow paddle are set forth above, and they may be mixed and matched with steps set forth in the preceding sentence in this paragraph.

Embodiments of the snow paddle can also be used to: remove debris from vehicles, decks, railings, and other structures; remove snow from the area around a vehicle; and quickly remove snow from tree wells to rescue snow boarders, skiers, etc.

Further, components of the snow paddle may be replaceable. For example, the scraper edge and the edge cap may be sized and formed to be replaceable on the paddle. Similarly, the foam grip may be removable and replaceable on the thickest telescoping tube section.

The process parameters, functions, system features, and sequence of steps described and/or illustrated herein are given by way of example only and may be varied and mixed and matched as desired. The various exemplary methods described and/or illustrated herein may also omit one or more of the steps described or illustrated herein or include additional steps in addition to those disclosed.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Unless otherwise indicated, all numbers or expressions, such as those expressing dimensions, physical characteristics, and the like, used in the specification (other than the claims) are understood to be alternately modified in all instances by the term "approximately." At the very least, and not as an attempt to limit the application of the doctrine of equivalents to the claims, each numerical parameter recited in the specification or claims which alternately modified by the term "approximately" should at least be construed in light of the number of recited significant digits and by applying ordinary rounding techniques.

All dimensions herein or in the Figures can be varied for varying circumstances, uses, and objects. They may be varied by ranges of plus or minus 0.01% through up to 1000% or even higher—also with the ranges in some embodiments varying by differing amounts for differing components.

As used in this specification, the term "laterally extending" means along a length of a referenced component that is at least fifty percent longer than the width of the component.

A statement of a numerical range includes a sub-statement all possible sub-ranges within the stated range.

We claim:

1. A collapsible snow paddle comprising:
    an elongated collapsible, telescoping handle having a longitudinal handle axis extending along the handle length;
    a rotatable coupling affixed to a proximal extremity of the handle and being rotatable transversely to the longitudinal handle axis;
    a resilient, substantially planar snow removal paddle having a rear surface intermediate opposed side edges of the snow removal paddle and affixed to the rotatable coupling, the snow removal paddle being rotatable with and about the rotatable coupling from a collapsed position adjacent the handle length to an extended position extended at an angle away from the handle; and
    a handgrip having (i) a somewhat tubular outer periphery transversely extending from a distal extremity of the handle, (ii) a plurality of telescoping sections, and (iii) a handle telescoping activation button penetrating the tubular outer periphery of the handgrip.

2. The snow paddle of claim 1 wherein the handgrip also a T shape with the top of the T shape comprising the somewhat tubular outer periphery of the handgrip.

3. The snow paddle of claim 1 and further comprising a soft hand grip tube disposed on and surrounding the handle intermediate the proximal and distal extremities.

4. The snow paddle of claim 1 wherein at least a portion of the handle has an oblong-shaped cross section.

5. The snow paddle of claim 1 wherein the dimensions of the snow removal paddle is about 8 inches by 11 inches.

6. The snow paddle of claim 1 wherein the handle comprises a plurality of obround telescoping sections.

7. The snow paddle of claim 6 wherein the handle comprises three obround telescoping sections.

8. The snow paddle of claim 6 wherein the handle when telescoped is about 20 inches in length and when extended is about 39 inches in length.

9. The snow paddle of claim 1 wherein an edge of a front surface of the snow removal paddle is inclined to define a scraper edge, the scraper edge forming an acute angle with the longitudinal handle axis of the handle.

10. The snow paddle of claim 9 wherein the rotatable coupling is affixed to the rear surface of the snow remover at a location offset from center of the snow removal paddle toward the scraper edge.

11. The snow paddle of claim 9 wherein a shovel edge of the front surface of the snow remover opposite the scraper edge is relatively softer than the scraper edge.

12. The snow paddle of claim 1 and further comprising a shovel cap disposed along an edge of the snow removal paddle, the cap being relatively softer than the snow removal paddle.

13. The snow paddle of claim 1 wherein the snow removal paddle is somewhat rectangular with a snow removal edge opposing an ice removal edge on the somewhat rectangular snow removal paddle.

14. A method of removing snow from a vehicle comprising:
    removing from storage a snow paddle having a handle with a longitudinal axis and a resilient generally planar snow removal paddle mounted to a rotatable coupling mounted to a handle end of the handle and rotatable transverse to the longitudinal axis of the handle;
    rotating the rotatable coupling transverse to the longitudinal axis of the handle about the handle end and moving the snow removal paddle from a collapsed position adjacent the handle to an extended position extending away from the handle at an angle to longitudinal axis of the handle;

first pressing of handle button in the handle to extend the handle prior to using the snow paddle;

using a capped edge of the snow removal paddle to remove snow from the vehicle; rotating the snow removal paddle into a parallel orientation with the handle;

second pressing of the handle button to telescope the handle; and replacing the snow paddle in storage.

15. The method of claim 14 wherein removing the snow paddle from storage comprises removing it from a snow paddle bag.

16. The method of claim 14 further comprising using a scraping edge of the snow remover to remove ice from a window of the vehicle.

17. The method of claim 14 wherein the handle button is located in T-shaped handgrip on an end of the handle opposite the snow removal paddle.

* * * * *

UNITED STATES PATENT AND TRADEMARK OFFICE
CERTIFICATE OF CORRECTION

PATENT NO. : 10,640,093 B2
APPLICATION NO. : 16/434087
DATED : May 5, 2020
INVENTOR(S) : Stephen Patrick Wood and Lorraine Lee Wood Page 1 of 1

It is certified that error appears in the above-identified patent and that said Letters Patent is hereby corrected as shown below:

In the Specification

Column 4 Line 66: delete "ul" and insert --A1--

Column 5 Line 1: delete "ul" and insert --A1--

Signed and Sealed this
Eleventh Day of August, 2020

Andrei Iancu
*Director of the United States Patent and Trademark Office*